US006459786B1

United States Patent
Bergström

(10) Patent No.: US 6,459,786 B1
(45) Date of Patent: Oct. 1, 2002

(54) CALL AND CONNECTION CONTROL

(75) Inventor: Bo Bergström, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/331,239

(22) PCT Filed: Nov. 27, 1997

(86) PCT No.: PCT/SE97/01990

§ 371 (c)(1),
(2), (4) Date: Dec. 1, 1999

§ 102(e) Date: Dec. 1, 1999

(87) PCT Pub. No.: WO98/27784

PCT Pub. Date: Jun. 25, 1998

(30) Foreign Application Priority Data

Dec. 19, 1996 (SE) ................................. 9604679

(51) Int. Cl.[7] ........................... H04M 3/00; H04L 12/28
(52) U.S. Cl. ........................................ 379/242; 370/422
(58) Field of Search .................. 379/242, 268, 379/269; 709/310, 313, 331, 400; 370/357, 360, 389, 422

(56) References Cited

U.S. PATENT DOCUMENTS

| | | | | |
|---|---|---|---|---|
| 5,471,526 A | * | 11/1995 | Linnermark et al. | 379/268 |
| 5,594,904 A | * | 1/1997 | Linnermark et al. | 717/4 |
| 5,606,659 A | * | 2/1997 | Maloy | 714/25 |
| 6,282,202 B1 | * | 8/2001 | Mainwaring et al. | 370/410 |

OTHER PUBLICATIONS

Katsumi Maruyama, IEICE Trans. Commun., vol. E75–B, No. 10, "Object–Oriented Switching Software Technology", Oct. 1992, pp. 957–968.
International Switching Symposium 1990, Session C3, Paper #3, "Innovations in Switching Technology", May 28–Jun. 1, 1990, pp. 1 and 97–106.

* cited by examiner

Primary Examiner—Ahmad F. Matar
Assistant Examiner—Benny Q. Tieu
(74) Attorney, Agent, or Firm—Burns, Doane, Swecker & Mathis, L.L.P.

(57) ABSTRACT

The present invention discloses a method, a node and a network on how to handle, in a secure and fast way, a large amount of calls that executes messages in parallel. This is achieved by for each new call creating a dynamic process for call control and a dynamic process for connection control. A static process for each signalling link is also included. When said call is finished all dynamic processes are terminated.

7 Claims, 7 Drawing Sheets

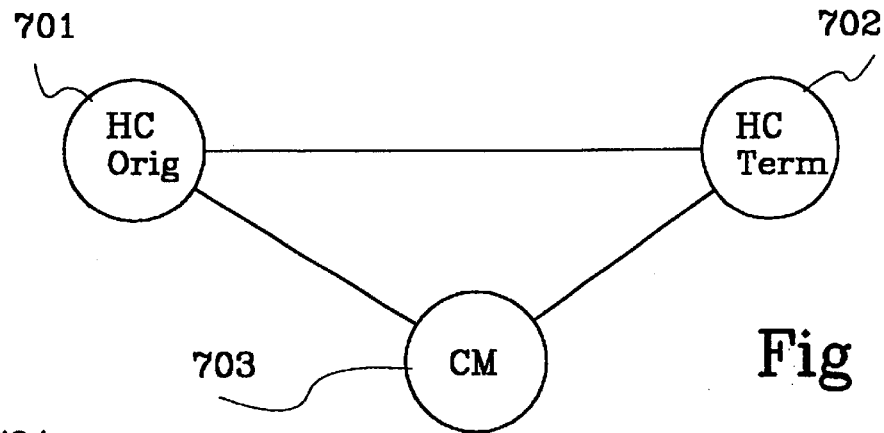
Fig 7a
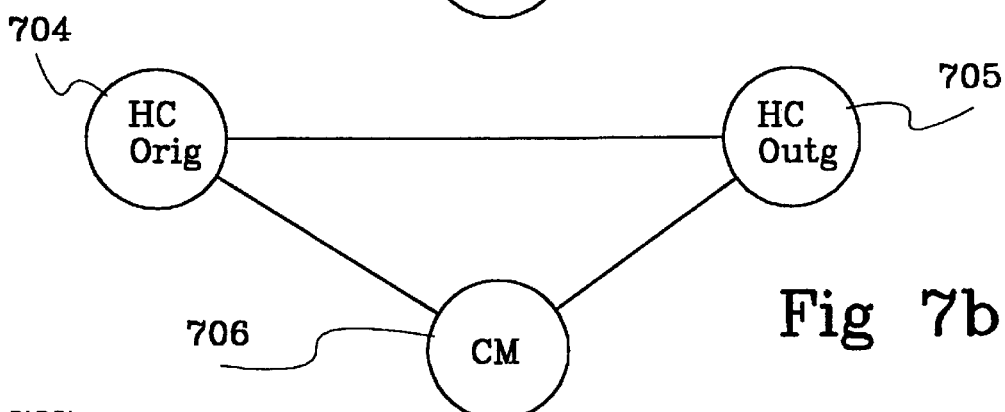
Fig 7b
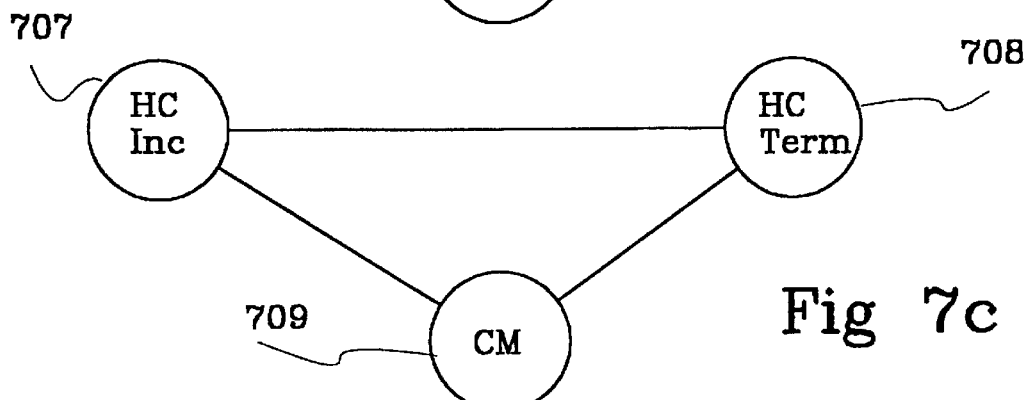
Fig 7c
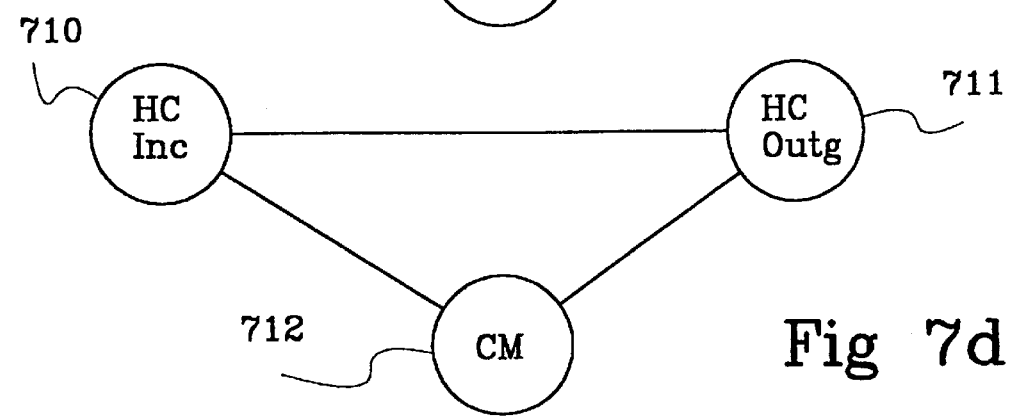
Fig 7d
Fig 7

CALL AND CONNECTION CONTROL

TECHNICAL FIELD OF INVENTION

The present invention regards telecommunication in general and effective and secure call and connection control handling in particular.

DESCRIPTION OF RELATED ART

The recent development within telecommunications with increased tele and data traffic together with requirements on improved efficiency and reduced cost has put hard requirements on telecommunication equipment. The rapid development in the business also puts forward requirements on quick, and secure, implementation of new features.

With the impending standardisation of B-ISDN (Broadband Integrated Services Digital Network), new services will be offered by carriers and third party vendors. These services include for example high bandwidth multimedia applications, multipoint applications and interactive applications. These new services and with the services associated protocols are switching, connection and signalling requirements which are substantially more complex than the requirements of today.

To be able to deal with these requirements as well as to be able to support a vast number of increasingly complex protocols the telecommunication industry needs supportive design tools and methods.

EP 0 631 456 discloses a distributed, server-based communications network architecture. In the architecture is various traditional call processing functions separated into distinct application entities.

SUMMARY OF THE INVENTION

The present invention discloses a method, a node and a network for handling, in a secure and fast way, a large amount of calls that executes messages in parallel.

The purpose of the present invention is thus to effectively and easily handle a large amount of calls in a node in a network.

The problem, described above, regarding how to handle a large amount of calls that executes messages in parallel is addressed for each new call by creating distinct new dynamic processes which communicate with other dynamic processes or with static processes and that when said call is finished said dynamic processes are ended.

The advantage with the present invention is that a large number of calls and messages can be handled simultaneously.

Another advantage is that the software is easily maintainable.

BRIEF DESCRIPTION OF THE DRAWINGS

FIG. 7 shows different configuration possibilities for Half-Call processes.

DETAILED DESCRIPTION OF PREFERRED EMBODIMENTS

A process is a computer program including data which executes in its own environment with its own stack. When a process terminates the memory which was associated with said process is completely cleared. In this description, processes come in two flavours, first there are dynamic processes, which are created by other processes, dynamic processes only live throughout their predetermined task execution, e.g. processes representing a call, only exist through the duration of the call. Second there are static processes which exist over a longer time; static processes create or serve the dynamic processes. The static processes are only terminated in the case of a major fault.

The message names used herein can be regarded as a sort of meta messages. They do not match messages specified in the ITU-T B-ISDN Q.2931 although some of the messages herein correspond to messages in Q.2931 while other messages are invented only for sake of clarity.

In the following description a message is used as meaning receiving and treating information in broad terms. It can be reception and treatment of a standardised Q.2931 message as well as an internal function call.

CALL MODEL

Figure 1:
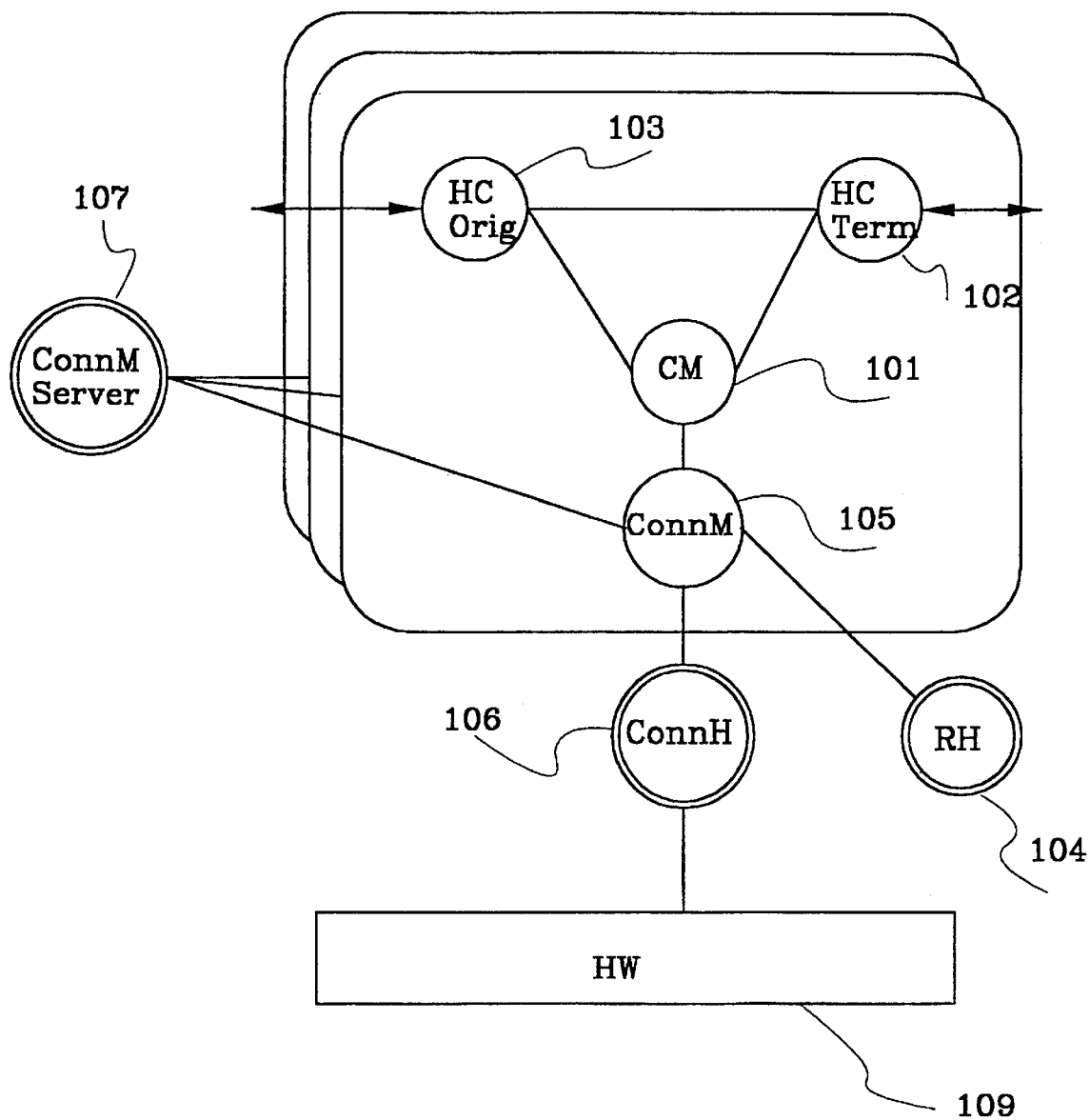
FIG. 1 shows process allocation of a preferred embodiment.

In FIG. 1 a dynamic process CM (Call Model) 101 is representing a call. Its purpose is to co-ordinate messages received from two half-call processes 102, 103 and messages sent to a RH (Resource Handler) process 104. Said RH process 104 is a static process for handling resource allocation.

Figure 2:
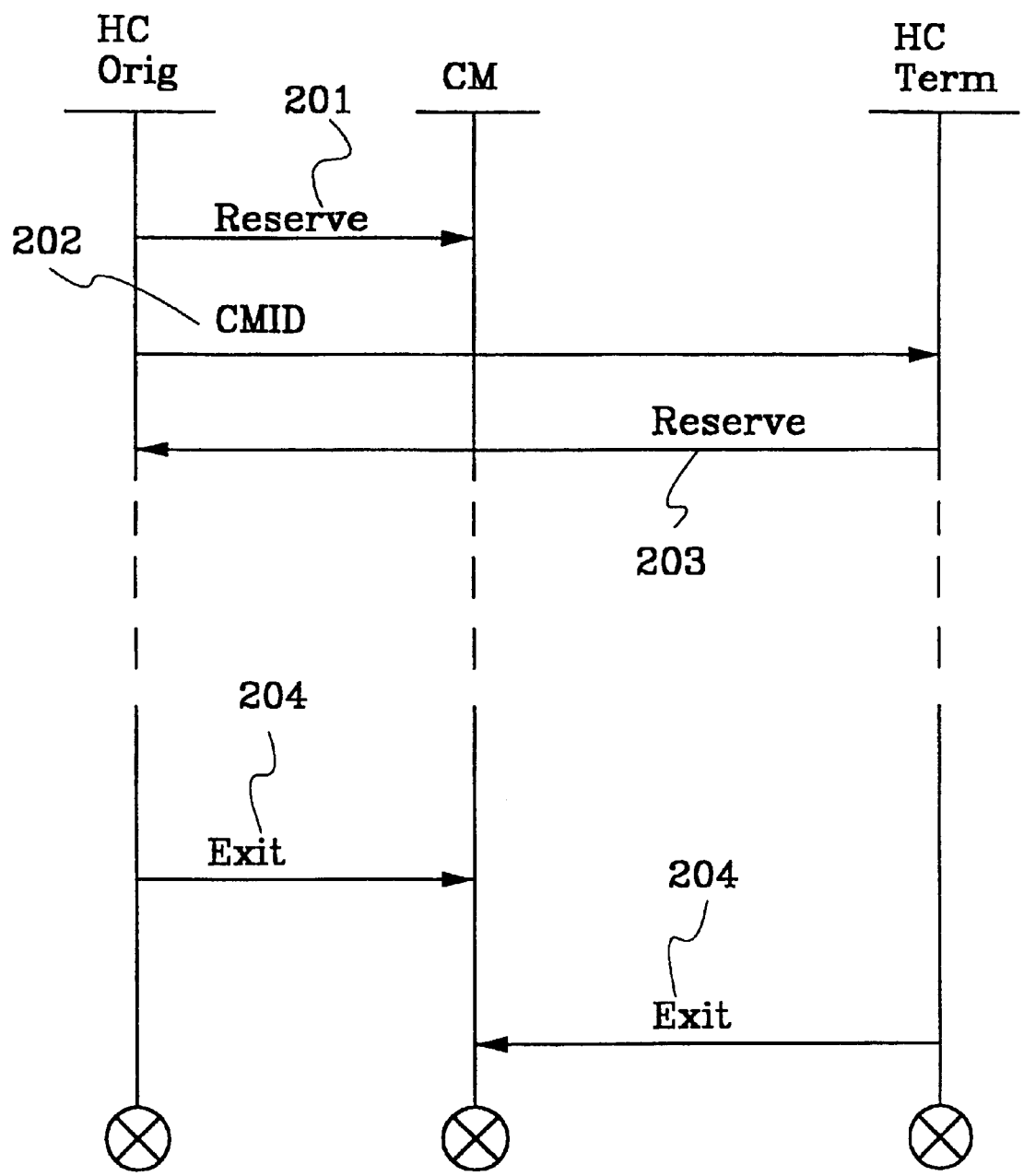
FIG. 2 shows signal flow in a preferred embodiment.

In the configuration of FIG. 1 the CM process 101 is started upon order from the process representing the originating 103 half-call. While referring to FIG. 2 it can be seen that in this embodiment the originating half-call process 103 is creating and sending a RESERVE message 201 to said CM process 101. The CM process 101 then links itself to the originating half-call process 103. Eventually, the terminating half-call process 102 will receive the CM identity from the originating half-call process 103 in a CMID message 202. Said terminating half-call will then send a RESERVE message 203 to said CM process 101. Said CM process 101 then links itself to the terminating half-call process 102.

In the following A-side will be used as a synonym for originating half-call process and; the term B-side will be used as a synonym for terminating half-call process.

During the life-cycle of a call, said CM process 101 acts on messages received from the A-side 103 and B-side 102. Said CM process 101 forwards each message to a ConnM (Connection Model) process 105. For each successfully executed message, said CM process 101 stores the result as process data. This data is then used when releasing the call.

Said CM process 101 traps exit messages in order to detect when both A-side and B-side 102, 103 are finished with their tasks.

Said CM process 101 terminates when an EXIT message 204 has been detected from both A-side 103 and B-side 102 and everything has been cleared towards the ConnM process 105. If an abnormal exit from any of the linked processes A-side 103, B-side 102 or the ConnM process 105 is detected, or if something remains to be done to clear the ConnM and both A-side 103 and B-side 102 terminates, the CM process 101 terminates with an abnormal exit reason. The cleaning-up towards the switch is then taken care of by a ConnMClean process (not shown), started by a ConnM Server (Connection Model Server) 107 when said ConnM Server 107 detects said abnormal exit.

CONNECTION MODEL

ConnM 105 is a dynamic process representing a connection. Its purpose is to take and return resources from the RH process 104. Said RH process keeps lists of the status of the available resources. A resource can for instance be blocked, out of order, occupied or in a number of other states. When resources are taken/returned, ConnM 105 will take/return the physical resources via a ConnH (Connection Handler) 106 process. Said ConnH process 106 is a static process dealing with the allocation of resources in hardware.

Figure 3:
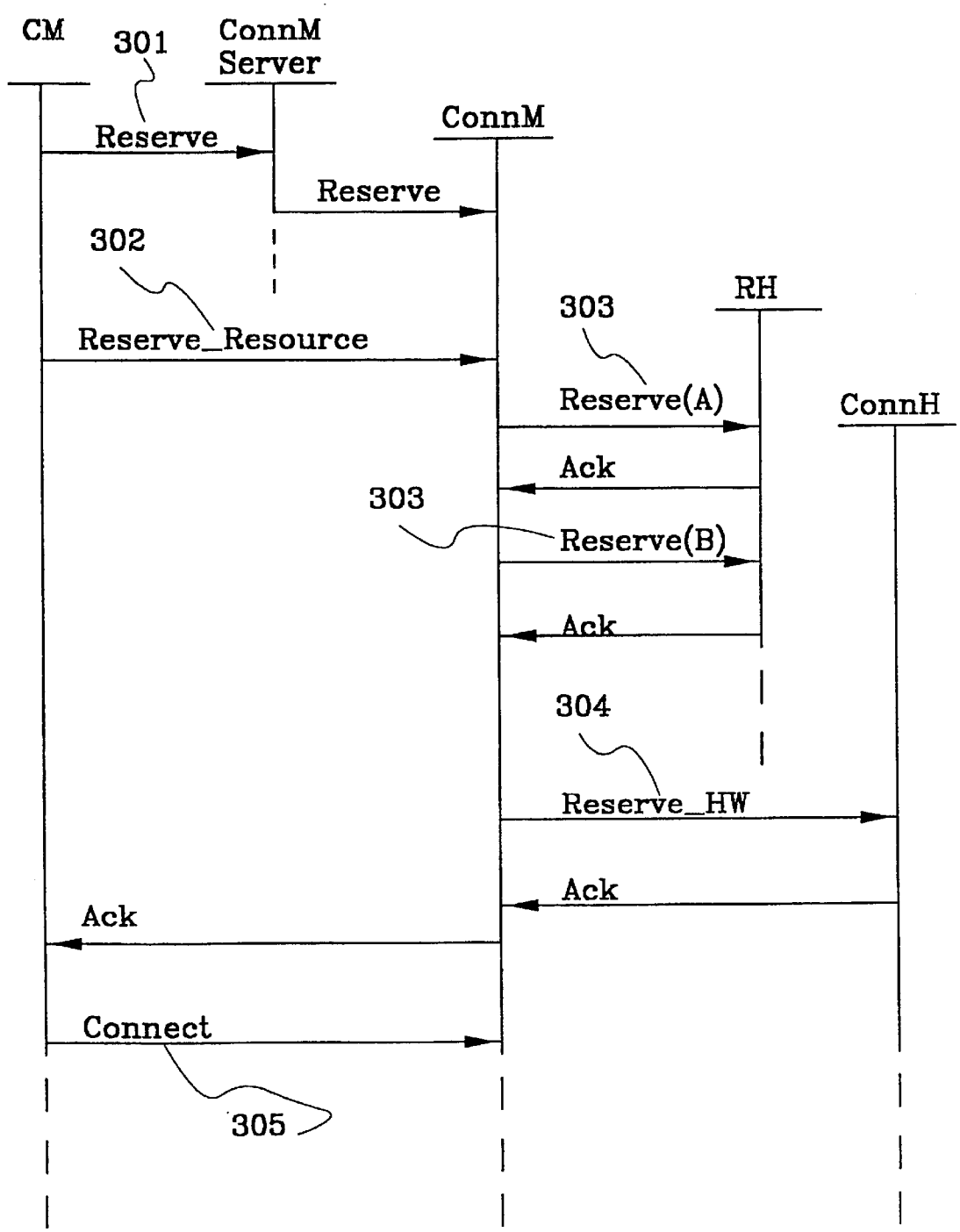
FIG. 3 shows signal flow in a preferred embodiment.

While referring to FIG. 1 and FIG. 3, the ConnM process 105 is started by and linked to the ConnM Server process 107 when a RESERVE message 301 is received by said ConnM Server 107 from the CM process 101. Said ConnM Server process 107 is a static process creating and serving ConnM processes. ConnM 105 is also linked to the CM 101 and to the ConnH process 106. The CM 101 identity is transferred to ConnM 105 when ConnM 105 is created.

During the life-cycle of a call, ConnM 105 acts on messages received from said CM process 101 and from said ConnH process 106. When the CM process 101 sends a RESERVE_RESOURCES message 302 to the ConnM process 105, ConnM 105 tries to get this resource from the RH process 104 via a RESERVE message 303. When resources are reserved for both A-side 103 and B-side 102, a RESERVE_HW message 304 is sent to the ConnH process 106 to make the reservations of the physical resources in hardware 109. Said CM process 101 will after this send a CONNECT message 305 to ConnM 105 to connect the reserved resources. In the above message handling, appropriate acknowledge messages are also sent as indicated in FIG. 3. There exists no necessity to include all these acknowledge signals but they can be convenient.

Figure 4:
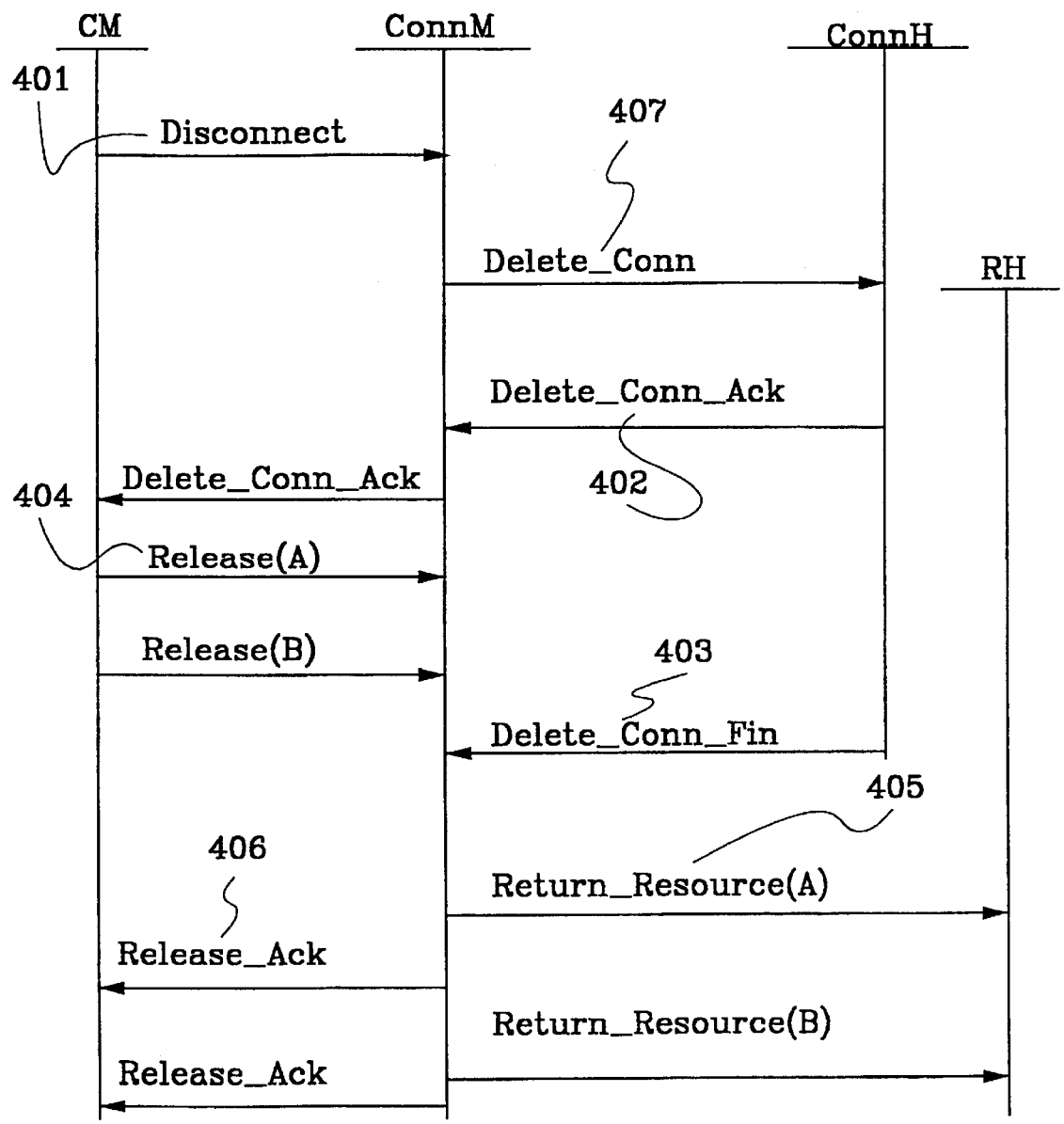
FIG. 4 shows signal flow in a preferred embodiment.

In FIG. 4 it can be seen that said CM process 101 orders a disconnection via a DISCONNECT message 401 to said ConnM process 105 to release the physical resources. The ConnM process 105 sends a DELETE_CONN message 407 to said ConnH process 106. An acknowledgement of the order is received in two steps. First a DELETE_CONN_ACK message 402 to said ConnM process 105, which is transferred to the CM process 101. A bit later a DELETE_CONN_FINISHED message 403 is received from said ConnH process 106. The DELETE_CONN_ACK message indicates the result of releasing the physical connection through the switch. The DELETE_CONN_FINISHED message gives the result of releasing the physical resources in the hardware 109. In between those two messages, one RELEASE message 404 for each half-call can be expected from said CM process 101.

When ConnM 105 has received both the DELETE_CONN_FINISHED message 403 and a RELEASE message 404, the resource is returned to the RH process 104 with a RETURN_RESOURCE message 405 and a RELEASE_ACK message 406 is sent to the CM process 101. The same procedure is repeated for the RELEASE message concerning the other half-call.

ConnM 105 terminates when all resources used for a connection are released or when said ConnM Server process 107, said CM process 101 or said ConnH process 106 terminates abnormally.

Figure 5:
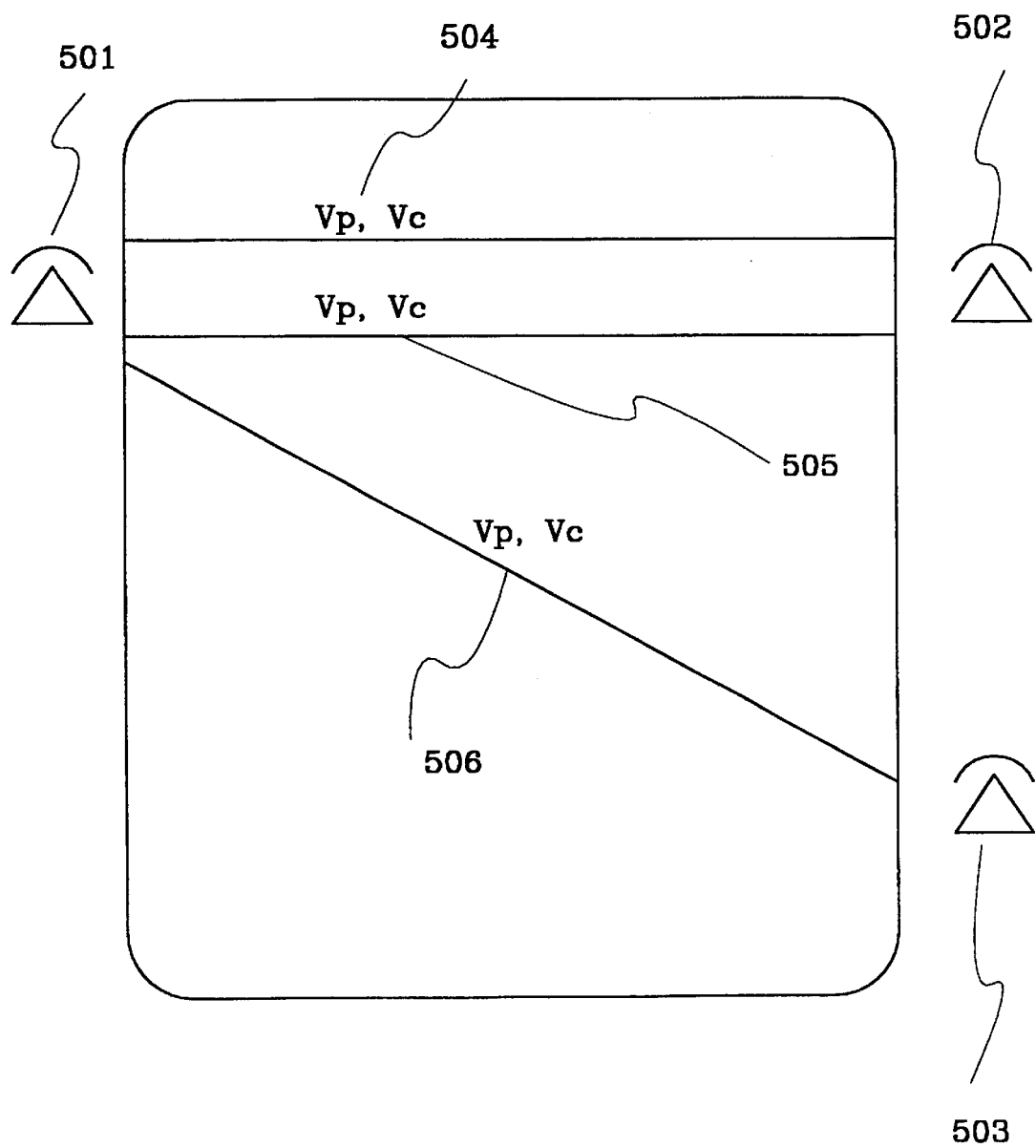
FIG. 5 shows a connection model in a different traffic case.

In FIG. 5, another configuration shown supported by the invention is shown. In FIG. 5 a first subscriber 501 is connected to a second 502 and a third 503 subscriber. Two connections 504 and 505 exist between the first subscriber 501 and the second subscriber 502, while one connection 506 exists between the first 501 and the third 503 subscriber.

Figure 6:
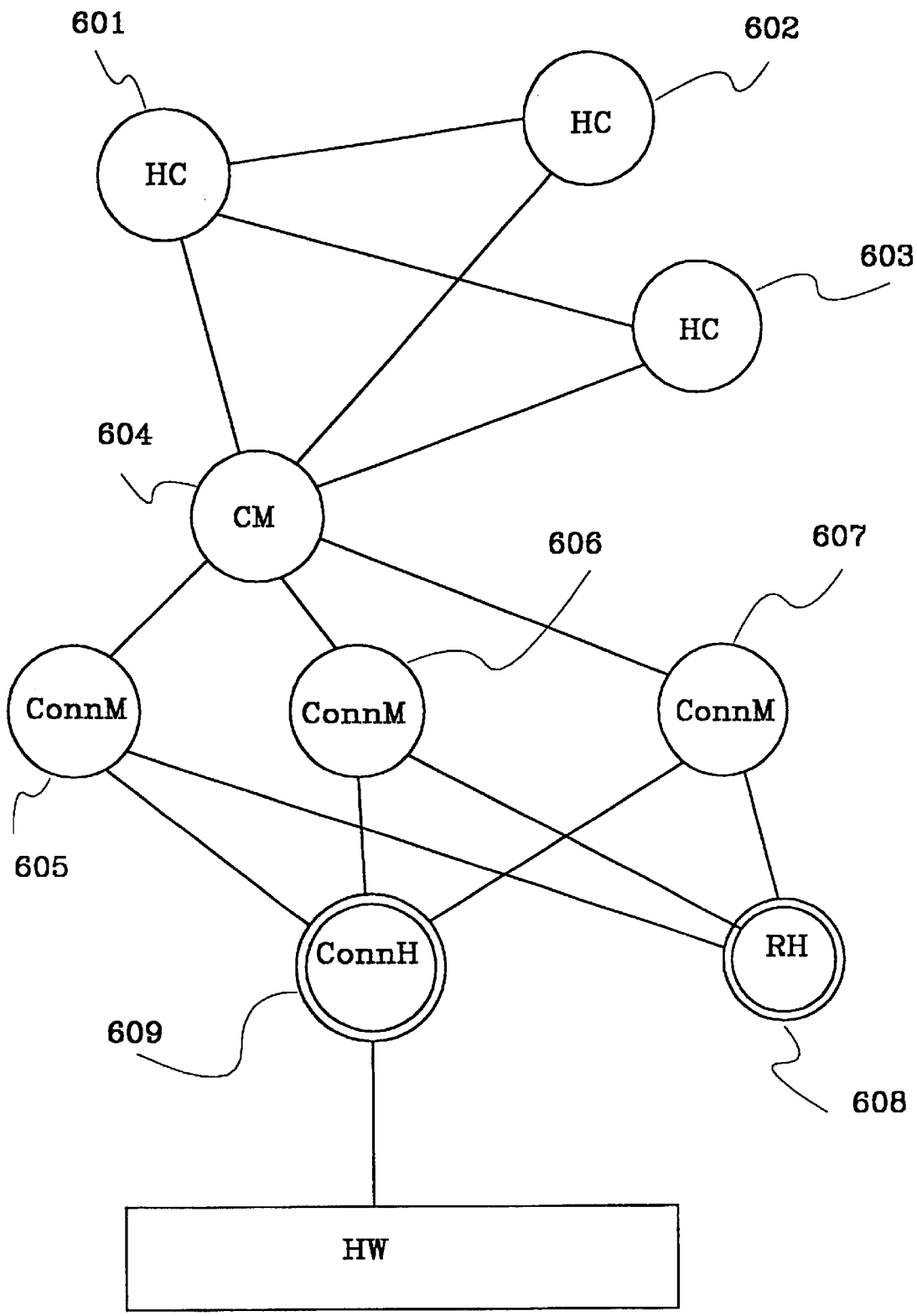
FIG. 6 shows a process allocation in a different traffic case.

In FIG. 6 is shown the process situation for the traffic case shown in FIG. 5. The establishment of the different connections in FIG. 5 and the creation of the processes in FIG. 6 take place in a similar way as described above and will not be dealt with further. In FIG. 6 a first half-call 601 represents the first subscriber 501, a second half-call 602 represents the second subscriber 502 and a third half-call 603 represents the third subscriber. One CM process 604 represents the call. A first ConnM process 605 represents the first connection 504, a second ConnM process 606 represents the second connection 505 and a third ConnM process 607 represents the third connection 506. Said CM process 604 forwards messages from the different half-call processes 601, 602 and 603 to the correct ConnM process 605, 606 and 607 each of which handles resource allocation with a RH process 608 and a ConnH process 609.

While an originating half-call process and a terminating half-call process have been used as an example in the description so far, other configurations for the half-call processes are possible as shown in FIG. 7. In FIG. 7a a CM process 703 is started upon order from an originating half-call process 701 and eventually connected to a terminating half-call process 702. In FIG. 7b a CM process 706 is started upon order from an originating half-call process 704 and eventually connected to an outgoing half-call process 705. In FIG. 7c the CM process 709 is started upon order from an incoming half-call process 707 and eventually connected to a terminating half-call process 708 and in FIG. 7d a CM process 712 is started upon order from an incoming half-call process 710 and eventually connected to an outgoing half-call process 711. In FIG. 7 some processes which are needed and which is included in the previous part of the description has been left out for sake of clarity.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for handling a large number of calls and connections in a node, said node being a part of an integrated data and telecommunication network, said method comprising the steps of:

for each new call attempt, creating a dynamic CM process;

creating a dynamic half-call process for each subscriber which participates in the call;

connecting said dynamic CM process to each of the dynamic half-call processes; and for each connection in the call, creating a dynamic ConnM process;

connecting said dynamic CM process to all the dynamic ConnM processes; and connecting each dynamic ConnM process to a static RH process and a static ConnH process.

2. A method according to claim 1, further comprising the steps of:

said dynamic CM process receiving a message from a half-call process; and said dynamic CM process forwarding the received message to the ConnM process that is to handle said message.

3. A method according to claim 1, further comprising the steps of:

said dynamic CM process receiving a message from a ConnM process; and said dynamic CM process forwarding said message to the half-call process that is to handle said message.

4. A method according to claim 1, wherein said RH process reserves resources on order from any ConnM process.

5. A method according to claim 2, wherein said static ConnH process reserves physical resources in the hardware on order from any ConnM process after said resource has been reserved by said static RH process.

6. A node for handling a large number of calls and connections in an integrated data and telecommunication network, said node comprising:
- a dynamic CM process arranged for handling a call, wherein, each subscriber which participates in the call is represented by a dynamic half-call process, and said dynamic CM process is connected to all half-call processes; and
- at least one dynamic ConnM process arranged for handling a connection, wherein said CM process is connected to all ConnM processes, and each ConnM process is connected to a static RH process and a static ConnH process.

7. An integrated data and telecommunication network for handling a large number of calls and connections, said network comprising:
a node, said node comprising:
- a dynamic CM process arranged for handling a call, wherein each subscriber that participates in the call is represented by a dynamic half-call process, and said CM process is connected to all half-call processes; and
- at least one dynamic ConnM process arranged for handling a connection, wherein said CM process is connected to all ConnM processes, and each ConnM process is connected to a static RH process and a static ConnH process.

* * * * *